Figure 1:
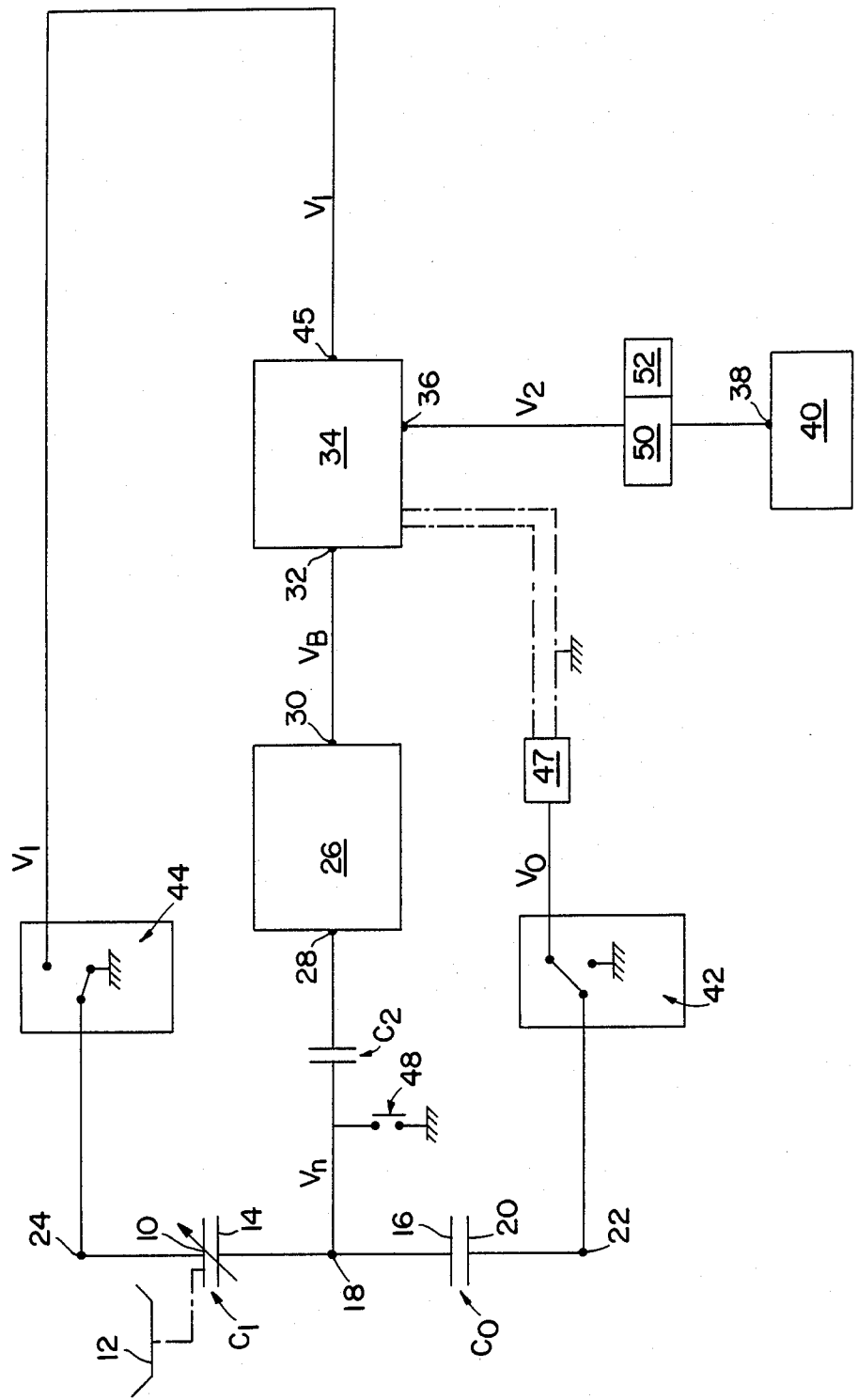

United States Patent [19]

Dauge

[11] Patent Number: 4,924,955
[45] Date of Patent: May 15, 1990

[54] ELECTRONIC WEIGHING DEVICE

[75] Inventor: Gilbert Dauge, Cormelles-Le-Royal, France

[73] Assignee: Moulinex, Societe Anonyme, Bagnolet, France

[21] Appl. No.: 389,881

[22] Filed: Jul. 25, 1989

[30] Foreign Application Priority Data

Jul. 25, 1988 [FR] France .................. 88 10028

[51] Int. Cl.$^5$ ................... G01G 3/14; G01G 23/14
[52] U.S. Cl. ............................. 177/210 C; 177/164
[58] Field of Search ...................... 177/210 C, 164; 76/862.64

[56] References Cited

U.S. PATENT DOCUMENTS

| | | | |
|---|---|---|---|
| 3,000,101 | 9/1961 | Giardino et al. | 177/20 C X |
| 4,372,405 | 2/1983 | Stuart | 177/210 C X |
| 4,461,363 | 7/1984 | Loy | 177/210 C X |
| 4,572,006 | 2/1986 | Wolfendale | 177/210 C X |

*Primary Examiner*—George H. Miller, Jr.
*Attorney, Agent, or Firm*—Young & Thompson

[57] ABSTRACT

Electronic weighing device adapted particularly to be mounted in a personal weighing scale and comprising a capacitative collector (C1) forming a measuring condenser whose capacity varies as a function of the weight to be measured and which has for this purpose a first electrode (10) connected mechanically to a weighing platform (12) and a second electrode (14) mounted fixedly in the casing. The measuring condenser is connected to a measuring circuit, which comprises: a reference condenser (C0) mounted in series with the measuring condenser (C1), each of these condensers having an electrode (14, 16) connected to a terminal (18) common to the two condensers and an electrode (20, 10) connected to an external non-common terminal (22, 24). A zero-voltage detector device (26) has an input (28) connected to the common terminal (18) by a third entry condenser (C2), and an output (30) connected to the input (32) of a signal treatment device (34) whose first output (36) is connected to the input (38) of a display device (40) of the weighing results. Two electronic switches (42, 44) comprise a reference one (42) connected to the external terminal (22) of the reference condenser (C0) and the other one (44) connected on the one hand to a second output (46) of the signal treatment device (44) and on the other hand to the external terminal (24) of the measuring condenser (C1).

5 Claims, 1 Drawing Sheet

ELECTRONIC WEIGHING DEVICE

The invention relates to an electronic weighing device particularly adapted to be mounted in a casing for personal weighing scales, comprising a capacitative recorder forming a measuring condenser whose capacitance varies as a function of the weight to be measured, and which has for this purpose a first electrode connected in a mechanical fashion to a weighing platform, and a second electrode fixedly mounted in the casing, said measuring condenser being connected to a measuring circuit.

The invention has in particular for its object to provide an electronic weighing device which can be mass produced, and which will be of simple and inexpensive design while ensuring high-resolution high-fidelity measurement.

It has also for an object to permit stable display of the weighing result while weighing people who are more or less movable on the weighing platform.

According to a first characteristic of the invention, this measuring circuit comprises: a so-called reference condenser mounted in series with the measuring condenser, each of these condensers having an electrode connected to a terminal common to the two condensers and an electrode connected to a non-common external terminal; a zero voltage detector device whose input is connected to said common terminal by means of a third so-called input condenser, and whose output is connected to the input of a signal-shaping device having a first output connected to the input of a display device of the weighing result; and two electronic switches, of which a so-called reference one is connected to the external terminal of the reference condenser and of which the other so-called measuring one is connected, on the one hand to a second output of the signal treatment device, and on the other hand to the external terminal of said measuring condenser, the two electronic switches being adapted each to have two successive states, namely, a first state in which the potentials of the external terminals are respectively zero voltage and an adjusted voltage, and a second state in which the potentials of the external terminals are respectively the reference voltage and zero voltage, the adjusted voltage being emitted from the second output of the signal treatment device so as to obtain a substantially zero voltage at the common terminal, said adjusted voltage being proportional to the variation of capacity of the measuring condenser.

Thus arranged, the measuring circuit is simple and reliable in operation whilst it performs only the comparison of the measuring condenser charge with the reference condenser charge to obtain equilibrium by means of the zero voltage detector device. Moreover, it will be understood that such a measuring circuit, except for the reference condenser, may be practically embodied in the form of an integrated circuit which will be particularly economical and durable for mass production.

According to a second characteristic of the invention, between the first output of the signal treatment device and the input of the display device are disposed a memory registering the successive results of the weighing and a computer performing an averaging of these successive results from the content of the memory.

Thanks to this computer which performs averaging of the measurement results over a sufficiently long time, the effect of movement of the body on the weighing platform will be negligible.

The characteristics and advantages of the invention will become more apparent from the description which follows, by way of example, with reference to the accompanying drawing in which:

FIG. 1 shows a schematic block diagram illustrating an electronic weighing device according to the invention.

The electronic weighing device is adapted in particular to be mounted in the casing of a personal weighing scale (not shown in the drawing) and comprises a capacitative collector C1 comprising a measuring condenser whose capacitance varies as a function of the weight to be measured and which has for this purpose a first electrode 10 connected mechanically to a weighing platform 12 and a second electrode 14 mounted fixedly in the casing, said measuring condenser being connected to a measuring circuit.

This measuring circuit comprises: a so-called reference condenser CO mounted in series with the measuring condenser C1, each of these condensers having an electrode 14, 16, connected to a terminal 18 common to the two condensers and an electrode 20, 10 connected to an external non-common terminal 22, 24; a zero-voltage detecting device 26 comprising, for example, a dynamic comparator (known per se) whose input 28 is connected to said common terminal 18 by means of a so-called input condenser C2 and whose output 30 is connected to the input 32 of a signal treatment device 34 which comprises, for example, a flip-flop with two outputs associated with a timer (not shown), and whose one first output 36 is connected to the input 38 of a device 40 for displaying the result of weighing; and two electronic switches 42, 44 such as field-effect transistors, of which a so-called reference one 42 is connected to the external terminal of the reference condenser CO and of which the other so-called measuring one 44 is connected, on the one hand to a second output 46 of the signal treatment device 34 and on the other hand to the external terminal 24 of said measuring condenser C1. The two electronic switches 42, 44 being adapted to have two successive states, namely, a first state in which the external terminal voltages 22, 24 are respectively zero voltage and an adjusted voltage V1, and a second state in which the external terminal potentials are respectively at the reference voltage V0 and at zero voltage, the adjusted voltage V1 being emitted from the second output 46 of the signal treatment device 34 so as to obtain practically zero voltage at the common terminal 18, said adjusted voltage V1 being such as to satisfy the ratio $C1 \cdot V1 = CO \cdot V0$.

So as to permit more reliable production of the electronic device, the sign of the adjusted voltage V1 and of the reference voltage V0 are chosen to be the same.

So as to ensure that the voltage at the common terminal 18 is indeed zero, during the initial phase which will be explained later, the measuring circuit comprises also an electronic switch 48 connected between the common terminal 18 and the remainder of the circuit and being adapted to have two states, a closed state connecting the common terminal 18 to said remainder and an open state in which the common terminal 18 is out of circuit with said remainder.

Between the first output 36 of the signal treatment device and the input 38 of the display device 40, are connected a memory 50 registering the successive results of weighing and a computer 52 effecting averaging of the successive results, not contained in the memory 50.

The device thus constituted operates as follows. During voltage supply to this device, the two switches 42, 44 and the switch 48 occupy successively their two respective states according to a sequence depending on the internal timer of the signal treatment device 34. This sequence is divided into three phases:

an initial phase in which the measuring switch 44 has the voltage of the external terminal 24 of the measuring condenser C1 at the adjusted voltage V1, while on the one hand the reference switch 42 connects the reference condenser CO to the rest of the circuit, and, on the other hand, the switch 48 is closed so as to ensure that the voltage of the common terminal 18 is indeed zero:

a cut-off phase of the common terminal 18 in which the switch 48 is open, while the two switches 42, 44 remain in the same state so that the measuring condenser C1 will remain charged (amplifiers not shown internal to the zero voltage detector 26 and to the signal treatment device 34 are returned to zero to avoid translatory phenomena);

and an observation phase of the state of the common terminal 18, in which the measuring switch 44 brings the external terminal 24 of the measuring condenser C1 to zero voltage, while the reference switch 42 brings the external terminal 22 of the reference condenser CO to the reference voltage V0, while the switch 48 remains open (phase shown in FIG. 1).

During weighing, the zero voltage detector 26 detects the variation of voltage at the common terminal 18 (so-called measuring voltage Vm) which arose as a result of commutation of the observation phase. According to the sign of this variation, there will appear at the output 30 of the zero voltage detector 26 and therefore at the input 32 of the signal treatment device 34 a binary signal VB, one for a positive variation of the weighing voltage, zero for a negative variation of the measuring voltage. The value of the ratio of the capacitances C1/CO is derived by the signal treatment device 34 thanks to the ratio of the voltage V0/V1 because C1 V1=CO VO. The signal treatment device 34 serves to equalize the value of the adjusted voltage V1, according to the value of binary signal VB, by means of its internal flip-flop with two outputs, one output being fixed at the reference voltage, the other output at zero voltage. If a signal VB is one, the adjusted voltage will have the value of the reference voltage VO; if the binary signal is zero, the adjusted voltage will be equal to zero. It therefore suffices to count the pulses at each output of the flip-flop during the time interval necessary to obtain the value of the adjusted voltage V1 which is applied by the device 34, during balancing of the variation of the capacity of the measuring condenser C1, this value being directly proportional to the weight.

These pulses, once counted, are sent in the form of a signal V2 to the memory 50, and to the calculator 52, then to the display device 40 from which can be read the weighing results.

The weighing device according to the present invention also permits measuring the weight of a person who does not stand still on the weighing platform 12. It will be recalled that the force to be measured exerted on said platform 12 corresponds to that which is due to weight, added to the relative movement of the person being weighed, which generates a stepped signal on which is superposed a zero mean undulation about the value of this step. This undulatory phenomenon militates against good interpretation of the weight measurement of the person. It is therefore necessary to stabilize the weighing results by a memory storage and an averaging of the successive fairly short time intervals (for example a half-second). In the memory 50 are stored during successive time intervals, the results of weighing, and the calculator effectuates a comparison between two successive results such that:

if two successive different results are of a value higher than a given quantity (several steps for example), the displayed result is then the last-registered result, which permits attenuating the translatory phenomena at the beginning of weighing;

if two successive results differ by less than the given quantity, the results are kept in the memory for a given interval of time sufficient to ensure stability of the measuring result under the conditions of use. The display is then as follows: on the successive results (P1 to Pn) stored in the memory, there are effectuated the successive averagings:

$$\frac{(P1 + P2)}{2} \ldots \frac{(P1 + P2 + \ldots + Pn)}{n},$$

the values of these successive averagings being then sent to the display device 40. When the number of measurements determined by the capacity of the memory (Pn results) has been taken into account, new weighing results then replace the preceding in the memory.

What is claimed is:

1. Electronic weighing device adapted particularly to be mounted in a casing of a personal weighing scale and comprising a capacitative collector (C1) forming a measuring condenser whose capacitance varies as a function of the weight to be measured and which has for this purpose a first electrode (10) connected mechanically to a weighing platform (12) and a second electrode (14) mounted fixedly in the casing, said measuring condenser being connected to a measuring circuit, characterized in that the measuring circuit comprises: a reference condenser (CO) mounted in series with the measuring condenser (C1), each of these condensers having an electrode (14, 16) connected to a terminal (18) common to the two condensers and an electrode (20, 10) connected to an external non-common terminal (22, 24); a zero-voltage detector device (26) whose input (28) is connected to said common terminal (18) by means of a third entry condenser (C2), and whose output (30) is connected to the input (32) of a signal treatment device (34) whose first output (36) is connected to the input (38) of a display device (40) of the weighing results; and two electronic switches (42, 44) of which a reference one (42) is connected to the external terminal (22) of the reference condenser (CO) and of which the other measuring switch (44) is connected on the one hand to a second output (46) of the signal treatment device (44) and on the other hand to the external terminal (24) of said measuring condenser (C1), the two electronic switches (42, 44) being adapted each to have two successive states, namely, a first state in which the voltages of the external terminals (22, 24) are brought respectively to zero voltage and to an adjusted voltage (V1), and a second state in which the potentials of the external terminals (22, 24) are brought respectively to a reference voltage (VO) and to zero voltage, the adjusted voltage (V1) being taken from the second output (46) of the signal treatment device (34) so as to obtain a substantially zero voltage at the common terminal (18), said adjusted voltage (V1) being such that C1 V1=CO V0.

2. Electronic weighing device according to claim 1, characterized in that the measuring circuit comprises also a switch (48) connected between the common terminal (18) and the rest of the circuit and being adapted to have two states, namely, a closed state connecting the common terminal (18) to said rest of the circuit and an open state in which the common terminal (18) is cut off from the rest of the circuit.

3. Electronic weighing device according to claim 1, in which said switches (42, 44) are field effect transistors.

4. Electronic weighing device according to claim 1, characterized in that between the first output (36) of the signal treatment device (34) and the input (38) of the display device (40), are connected a memory (50) registering the successive results of weighing and a calculator (52) effecting an averaging of the successive results from the content of the memory.

5. Electronic weighing device according to claim 4, characterized in that in the memory (50) are stored, during successive time intervals, the weighing results, and the calculator effectuates a comparison between two successive results such that if two successive results differ by an amount greater than a given quantity, the displayed result is the latter, and if two successive results differ by less than the given quantity, the display will then be the successive averages of the results stored in the memory.

* * * * *